INVENTOR.
JULIUS B. EVANS
BY Donald G. Dalton
ATTORNEY

INVENTOR.
JULIUS B. EVANS
BY Donald G. Dalton
ATTORNEY

Aug. 25, 1959  J. B. EVANS  2,901,060
CLEANER FOR THE CONICAL BOTTOM OF DUST CATCHER
Filed Dec. 31, 1957  3 Sheets-Sheet 3

INVENTOR.
JULIUS B. EVANS
Donald G. Dalton

ATTORNEY

United States Patent Office 2,901,060
Patented Aug. 25, 1959

2,901,060

CLEANER FOR THE CONICAL BOTTOM OF DUST CATCHER

Julius B. Evans, Chicago, Ill., assignor to United States Steel Corporation, a corporation of New Jersey Application December 31, 1957, Serial No. 706,379

6 Claims. (Cl. 183—76)

This invention relates to a cleaner for the conical bottom of a dust catcher and more particularly to a dust catcher for use in separating dust from blast furnace gas. In such dust catchers it is common to introduce steam into the dust catcher to prevent dust explosions. This causes the moist dust to collect on the conical bottom of the catcher and in time the dust packs and hardens to such extent that it clogs the dust catcher so that it cannot be used. It is then necessary to remove the dust by blasting it out with dynamite which is an expensive and dangerous operation. It is therefore an object of my invention to provide a cleaner for the bottom of a dust catcher which will periodically remove accumulation of dust on the bottom of the catcher.

This and other objects will be more apparent after referring to the following specification and attached drawings, in which.

Figure 4:
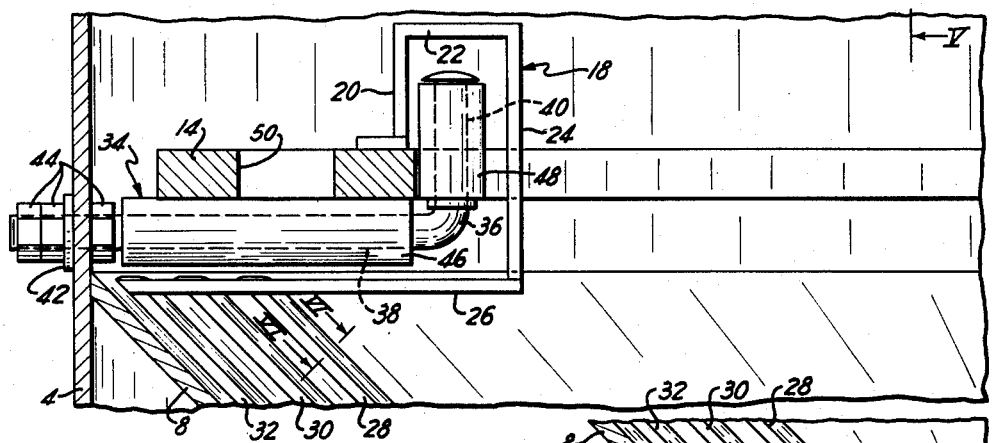
Figure 4 is a view taken on the line IV—IV of Figure 2.
Figure 5:
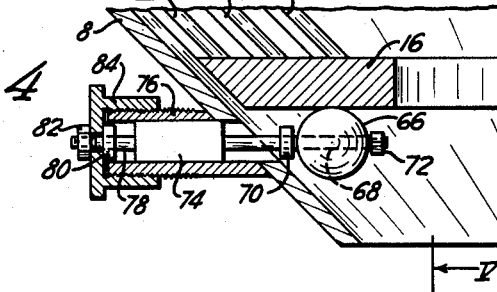
Figure 5 is a view taken on the line V—V of Figure 4.
Figure 5:
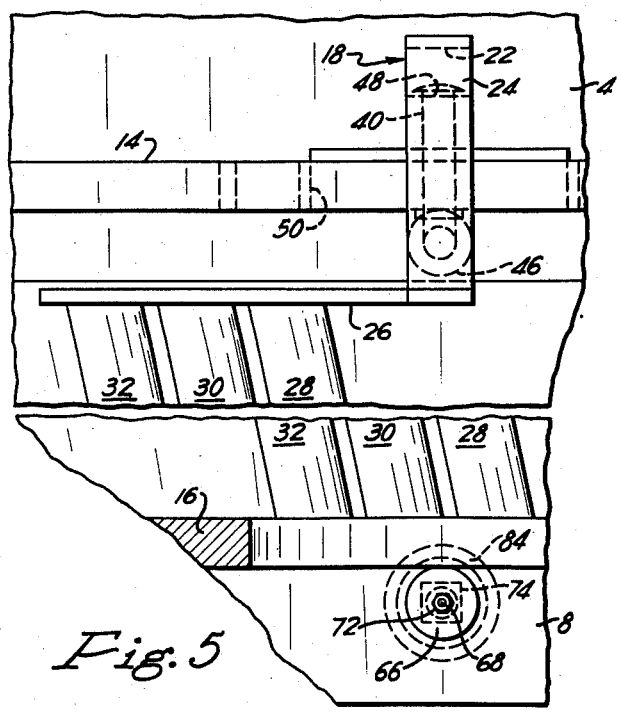
Figure 6:
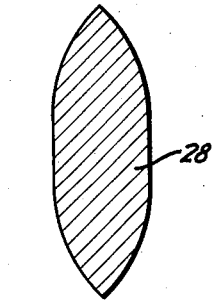
Figure 6 is a view taken on the line VI—VI of Figure 4.

Referring more particularly to the drawings, reference numeral 2 indicates a dust catcher having a shell 4 into which gas is introduced through a downcomer 6. A conical shell 8 is provided at the bottom of the dust catcher. After the blast furnace gas passes through the dust catcher 2 it passes out through takeoff 10 at the top of the dust catcher. The usual bleeder 12 is provided at the top of the dust catcher. The cleaner of my invention includes a larger upper ring 14 and a small lower ring 16. A plurality of brackets 18 are attached to the upper side of the upper ring 14. As best shown in Figures 4 and 5, each of the brackets 18 consists of an upwardly extending leg 20 fastened to the top of ring 14, a portion 22 extending inwardly from portion 20, a portion 24 extending downwardly from the portion 22 and an outwardly extending portion 26 attached to the bottom of portion 18 beneath the ring 14 in spaced relationship therewith. Portion 26 extends outwardly and rearwardly from the portion 24 at an angle with respect to the direction of rotation of the ring 14. Three rods 28, 30 and 32 are fastened to the portion 26. Rods 28, 30 and 32 are arranged at an angle to the radius of ring 14 with the rods diverging from the ring 14 rearwardly with respect to the direction of rotation. The bars 28, 30 and 32 are preferably oval-shaped as shown in Figure 6 with the sharp end extending in the direction of rotation. The parts of the cleaner may be united in any desired manner such as by means of welding.

The ring 14 is supported by means of a plurality of brackets 34. As best shown in Figure 4, each of the brackets 34 consists of a bent rod 36 having a horizontal leg 38 and vertical leg 40. The outer end of the rod 36 is threaded and passes through an opening in the shell 4. The opening in the shell 4 and the shape of the rod 36 in the opening is preferably noncircular to prevent the rod from turning. A gasket 42 surrounds the rod 36 where it passes through the shell. Nuts 44 are threaded on the rod 36 on each side of the shell 4 for fastening it in place. A pipe 46 loosely surrounds the horizontal portion 38 and a pipe 48 loosely surrounds the vertical portion 40 of rod 36. The top of the vertical portion 40 may be peened over as shown or a nut threaded thereon to prevent pipe 48 from moving upwardly. The ring 14 is provided with a plurality of openings 50 around its periphery for receiving teeth 52 of a gear 54. Gear 54 is mounted on a shaft 56 which passes outwardly through the shell 4 to reduction gearing 58 driven from a motor 60 mounted on a bracket 62. Combined bearing and seal 64 surrounds the shaft 56 where it passes through the shell 4.

The lower ring 16 is mounted on a plurality of bearing balls 66. As best shown in Figure 4, each of the bearing balls 66 is mounted on a shaft 68 and is held from longitudinal movement by means of a shoulder 70 and a nut 72 threaded on the end of the shaft 68. Shaft 68 is attached to a rectangular block 74 which is slidably received in a sleeve 76. The sleeve 76 is welded or otherwise attached to the shell 8. A rod 78 is attached to the outer end of block 74 and has a shoulder 80 thereon. The outer end of rod 78 is threaded to receive a nut 82. An internally threaded outer sleeve 84 is threaded on the inner sleeve 76. To move the ball 66 inwardly it is only necessary to screw the sleeve 84 inwardly until it bears on the shoulder 80. Continued movement of the sleeve then moves the block 74 and ball 66 inwardly. Once positioned the nut 82 is tightened to hold the assembly in place.

Figure 1:
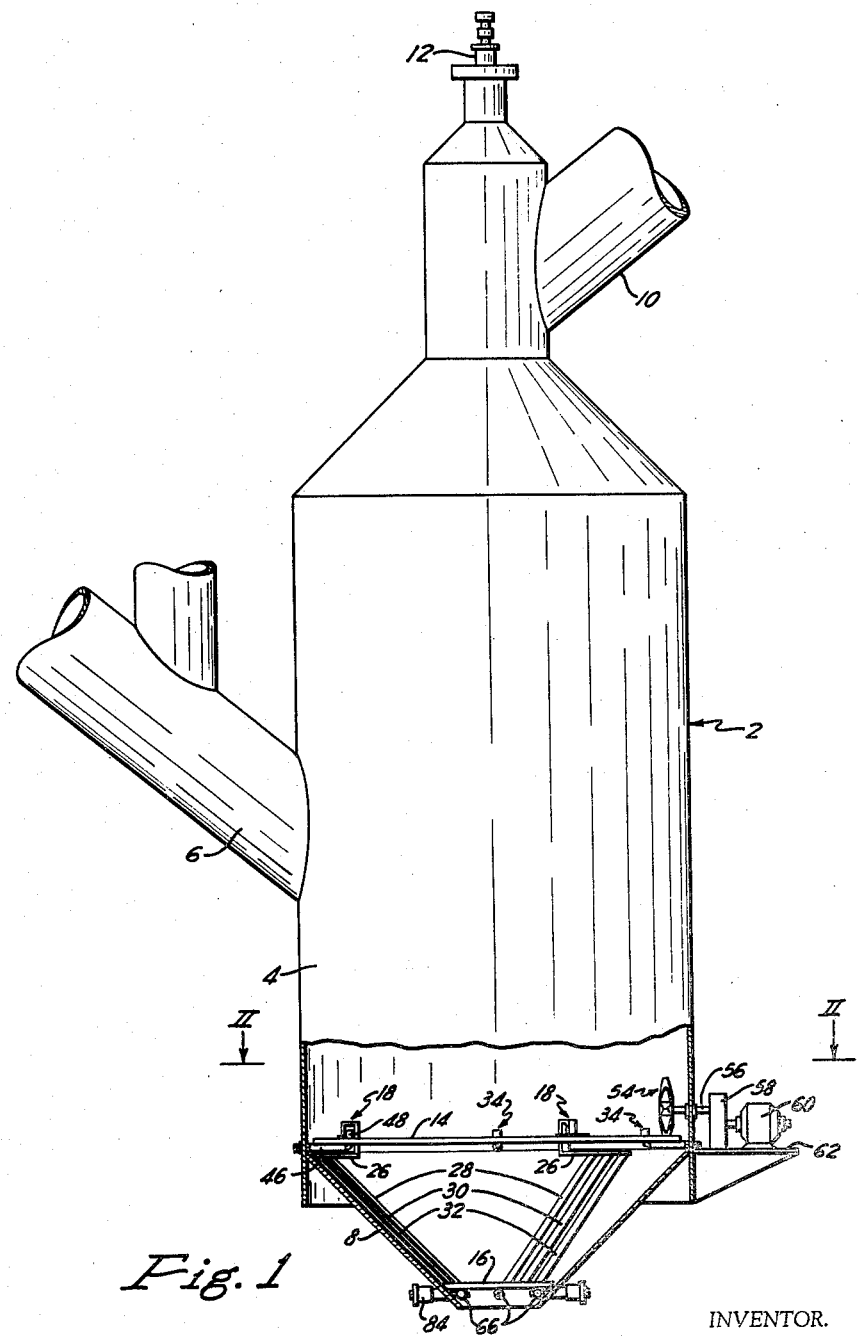
Figure 1 is an elevation of a dust catcher with parts broken away and shown in section.
Figure 2:
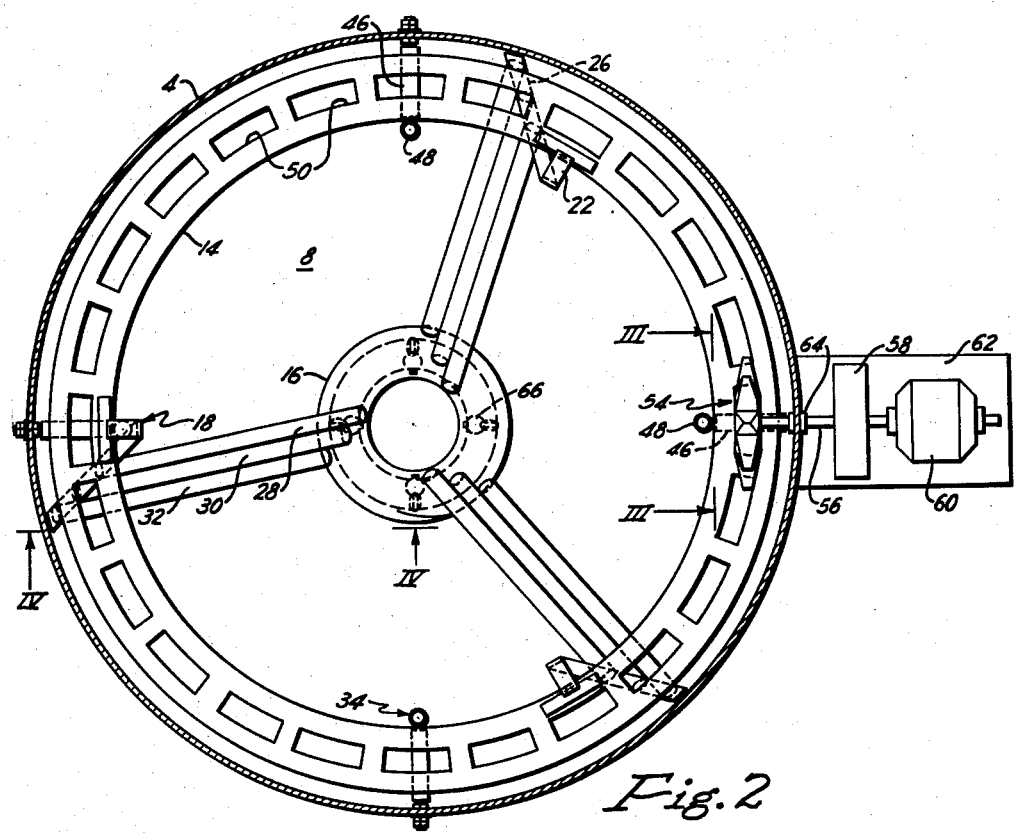
Figure 2 is a view taken on the line II—II of Figure 1.
Figure 3:
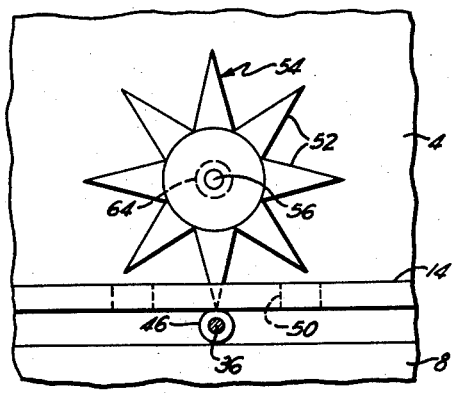
Figure 3 is a view taken on the line III—III of Figure 2.

In operation, the motor 60 is periodically operated to rotate the gear 54 which engages in openings 50. This causes the rings 14 and 16 to rotate on pipes 46 and balls 68, respectively, in the direction of the arrow in Figure 2. As the rings 14 and 16 rotate the bars 28, 30 and 32 contact the dust accumulations and cut their way therethrough to remove the dust.

While one embodiment of my invention has been shown and described it will be apparent that other adaptations and modifications may be made without departing from the scope of the following claims.

I claim:

1. A cleaner for the conical bottom of a dust catcher comprising a large upper ring adjacent the top of said conical bottom, a small lower ring spaced below said upper ring in said conical bottom, a plurality of brackets attached to the top of the upper ring and each having a portion extending inwardly toward the center of the cleaner and downwardly below said upper ring, a portion on each of said brackets extending outwardly away from the center of said cleaner below said upper ring, a plurality of rods fastened to the last named portion of each of said brackets and to said lower ring at different radial distances from the center of said rings, the most outwardly of said rods being adjacent the wall of said conical bottom, horizontal bearings attached to the wall of said dust catcher at spaced intervals and extending inwardly toward the center of said catcher for supporting said upper ring, bearings attached to said conical bottom for supporting said lower ring, and means for rotating said rings whereby material on the wall of said conical bottom is removed by said rods.

2. A cleaner for the conical bottom of a dust catcher comprising a large upper ring adjacent the top of said conical bottom, a small lower ring spaced below said upper ring in said conical bottom, a plurality of brackets attached to the top of the upper ring and each having a portion extending inwardly toward the center of the cleaner and downwardly below said upper ring, a portion of each of said brackets extending outwardly away from the center of said cleaner below said upper ring, a plurality of rods fastened to the last named portion of each of said brackets and to said lower ring at different radial distances from the center of said rings, the most outwardly of said rods being adjacent the wall of said conical bottom, horizontal bearings attached to the wall of said dust catcher at spaced intervals and extending inwardly toward the center of said catcher for supporting said upper ring, bearings attached to said conical bottom for supporting said lower ring, said upper ring having openings extending downwardly therethrough, a gear mounted on the walls of said dust catcher with its axis substantially horizontal and adapted to engage in said openings, and means for rotating said gear whereby material on the wall of said conical bottom is removed by said rods.

3. A cleaner for the conical bottom of a dust catcher comprising a large upper ring adjacent the top of said conical bottom, a small lower ring spaced below said upper ring in said conical bottom, a plurality of brackets attached to the upper ring, each bracket extending upwardly from the top of the ring, then inwardly toward the center of the cleaner and downwardly below said upper ring and outwardly away from the center of said cleaner, a plurality of rods fastened to the bottom of each of said brackets and to said lower ring at different radial distances from the center of said rings, the most outwardly of said rods being adjacent the wall of said conical bottom, horizontal bearings attached to the wall of said dust catcher at spaced intervals and extending inwardly toward the center of said catcher for supporting said upper ring, bearings attached to said conical bottom for supporting said lower ring, and means for rotating said rings whereby material on the wall of said conical bottom is removed by said rods.

4. A cleaner for the conical bottom of a dust catcher comprising a large upper ring adjacent the top of said conical bottom, a small lower ring spaced below said upper ring in said conical bottom, a plurality of brackets attached to the upper ring, each bracket extending upwardly from the top of the ring, then inwardly toward the center of the cleaner and downwardly below said upper ring and outwardly away from the center of said cleaner, a plurality of rods fastened to the bottom of each of said brackets and to said lower ring at different radial distances from the center of said rings, the most outwardly of said rods being adjacent the wall of said conical bottom, horizontal bearings attached to the wall of said dust catcher at spaced intervals and extending inwardly toward the center of said catcher for supporting said upper ring, bearings attached to said conical bottom for supporting said lower ring, said upper ring having openings extending downwardly therethrough, a gear mounted on the walls of said dust catcher with its axis substantially horizontal and adapted to engage in said openings, and means for rotating said gear whereby material on the wall of said conical bottom is removed by said rods.

5. A cleaner for the conical bottom of a dust catcher comprising a large upper ring adjacent the top of said conical bottom, a small lower ring spaced below said upper ring in said conical bottom, a plurality of brackets attached to the upper ring, each bracket extending upwardly from the top of the ring, then inwardly toward the center of the cleaner and downwardly below said upper ring and outwardly away from the center of said cleaner, a plurality of rods fastened to the bottom of each of said brackets and to said lower ring at different radial distances from the center of said rings, the most outwardly of said rods being adjacent the wall of said conical bottom, a plurality of rods attached to the walls of said dust catcher adjacent the top of said conical bottom and spaced apart circumferentially thereof, each of said last named rods extending horizontally inwardly toward the center of the cleaner and then upwardly, a pipe loosely surrounding the horizontal portion of each of said last named rods, a second pipe loosely surrounding the vertical portion of each of said last named rods, said upper ring resting on said horizontal pipes, bearings attached to said conical bottom for supporting said lower ring, and means for rotating said rings whereby material on the wall of said conical bottom is removed by said first named rods.

6. A cleaner for the conical bottom of a dust catcher comprising a large upper ring adjacent the top of said conical bottom, a small lower ring spaced below said upper ring in said conical bottom, a plurality of brackets attached to the upper ring, each bracket extending upwardly from the top of the ring, then inwardly toward the center of the cleaner and downwardly below said upper ring and outwardly away from the center of said cleaner, a plurality of rods fastened to the bottom of each of said brackets and to said lower ring at different radial distances from the center of said rings, the most outwardly of said rods being adjacent the wall of said conical bottom, a plurality of rods attached to the walls of said dust catcher adjacent the top of said conical bottom and spaced apart circumferentially thereof, each of said last named rods extending horizontally inwardly toward the center of the cleaner and then upwardly, a pipe loosely surrounding the horizontal portion of each of said last named rods, a second pipe loosely surrounding the vertical portion of each of said last named rods, said upper ring resting on said horizontal pipes, bearings attached to said conical bottom for supporting said lower ring, said upper ring having openings extending downwardly therethrough, a gear mounted on the walls of said dust catcher with its axis substantially horizontal and adapted to engage in said openings, and means for rotating said gear whereby material on the wall of said conical bottom is removed by said first named rods.

References Cited in the file of this patent

UNITED STATES PATENTS

| | | |
|---|---|---|
| 404,217 | Morse | May 28, 1889 |
| 816,460 | Geisendorfer et al. | Mar. 27, 1906 |
| 827,460 | Morse | July 31, 1906 |